United States Patent [19]

Hagopian et al.

[11] 4,029,633

[45] June 14, 1977

[54] CARBON BLACK-RUBBER MASTERBATCH PRODUCTION

[75] Inventors: Erivan Hagopian, Lexington; Allan Clark Morgan, Sudbury, both of Mass.

[73] Assignee: Cabot Corporation, Boston, Mass.

[22] Filed: Apr. 14, 1976

[21] Appl. No.: 676,970

[52] U.S. Cl. .......................... 260/42.55; 260/746; 260/763

[51] Int. Cl.² ......................................... C08K 3/04

[58] Field of Search ............... 260/42.55, 746, 763

[56] References Cited

UNITED STATES PATENTS

| 2,769,795 | 11/1956 | Braendle | 260/42.55 |
| 3,108,982 | 10/1963 | Barclay | 260/42.55 |

*Primary Examiner*—James H. Derrington
*Attorney, Agent, or Firm*—Jack Schuman; Lawrence A. Chaletsky; Barry R. Blaker

[57] ABSTRACT

This disclosure relates to a continuous process for the preparation of rubber masterbatches.

7 Claims, No Drawings

CARBON BLACK-RUBBER MASTERBATCH PRODUCTION

This invention relates to a process for the preparation of masterbatches comprising carbon black and rubber. In particular, this invention relates to a novel process for the preparation of rubber masterbatches from an aqueous natural or synthetic rubber latex and an aqueous slurry of carbon black.

Moreover, the process of this invention eliminates several problems frequently encountered with conventional methods of rubber masterbatching. For example, in the conventional methods of coagulating latex masterbatch, the contact time of the rubber crumb and the coagulating acid is poorly controlled. There have also been problems associated with the prior art masterbatching techniques involving the carbon black-latex creaming reaction as well as the part of the process where the mixture of carbon black and latex is mixed with the coagulating liquor.

Accordingly, it is a primary object of this invention to provide a novel and improved process for the preparation of masterbatches comprising a natural or synthetic rubber and carbon black in which the attendant disadvantages of the prior art are eliminated.

A more specific object of this invention is to provide a well-controlled process for preparing masterbatches of carbon black in rubber.

Other and different objects, advantages and features of the present invention will become apparent to those skilled in the art upon consideration of the following detailed description and claims.

In accordance with this invention, it has been found that the above and still further objects are achieved by the utilization of a novel and improved process for the preparation of black masterbatches. The process entails forming aqueous slurries of carbon black in the conventional manner. This includes aqueous slurries of carbon black where the concentration of carbon black in the aqueous medium ranges up to about 30 percent by weight, and preferably ranges from at least 5 to about 20 percent by weight. It is furthermore preferred to employ carbon black in the form of dense, highly compressed pellets which are relatively non-dusting and easy to handle. In the preparation of the black masterbatches, the amount of carbon black to be incorporated into the rubber compositions is determinative of the amount of carbon black slurry to be utilized. Normally, a useful rubber composition contains from about 10 to about 250 parts by weight of carbon black for each 100 parts by weight of natural or synthetic rubber. The rubber latex used herein, which includes both natural and synthetic rubbers, may be of any type normally used hereinbefore and is completely described in numerous prior art references. These, of course, include such rubbers as nitrile rubbers, halogenated rubber, polychloroprene, styrene-butadiene rubber (SBR), acrylics and the like as well as the various natural rubbers.

The masterbatch process of this invention is relatively simple yet quite effective. The process is successful in assuring a resultant rubber crumb having a uniform contacting of rubber with acidic coagulating liquor as well as a proper mixing of carbon black-latex mixture with coagulating liquor. In general, the process of this invention is similar to the prior art in many of the operations. Among these are the preparations of the aqueous carbon black slurries and the creaming of the carbon black-latex mixture, using if desired any of the known creaming agents such as sodium chloride, zinc chloride, alum and the like. The coagulating liquor employed herein is also well known to those skilled in the art in that it comprises a dilute aqueous stream acidified by means of any organic or mineral acid normally employed for this purpose in conventional amounts and concentrations. A particularly preferred acid is glacial acetic acid. The amount of acid used is sufficient to assure proper coagulation of the carbon black-latex mixture and, in a preferred embodiment, is such as to cause the coagulating liquor stream to be maintained at a pH value of about 2.5 to 3.0.

The remainder of the masterbatching process, following the coagulation operation, includes the steps of separating the rubber crumb from the serum. The crumb thus obtained is washed and recovered, in essentially 100% yield, and the serum is recycled for use in the stream of coagulating liquor.

In carrying out this process, it is essential that the carbon black slurry and the latex be introduced in the form of two separate continuous streams, in the desired ratio, by means of suitable metering devices. Most conveniently the two streams, i.e., the carbon black slurry and latex, are introduced into a stainless steel tube under controlled conditions whereby a uniform dispersion of the carbon black and latex is obtained. The stainless steel tube, only a preferred device herein, serves to assure a proper period of time during which the creaming of the carbon black-latex mixture occurs. During the creaming operation, it has been found that conditions of low shear result in the production of rubber crumbs of optimum quality.

Following the creaming of the carbon black-latex mixture, the coagulation of the mixture must be carried out, and in the process of this invention, it is done in a unique manner. More particularly, the creamed carbon black-latex mixture is introduced as a coherent stream into the core of a stream of the coagulating liquor. The solid stream of creamed carbon black-latex mixture is discharged into the stream of coagulating liquor in a direction substantially transverse to the axis of the stream of coagulating liquor through at least one opening from the periphery of the stream of coagulating liquor. This novel method of achieving coagulation involves a shearing and atomizing of the stream of creamed carbon black-latex mixture by the stream of coagulating liquor prior to coagulation. The mixture resulting from the contacting of the creamed carbon black-latex and the coagulating liquor is then passed to a suitable reaction zone wherein completion of the coagulation is achieved. As mentioned earlier, once the coagulation is completed, the remainder of the process is conventional and includes separation of the serum from the rubber crumb. The rubber crumb is washed and dried while as much of the serum as possible is recycled into the coagulating liquor for further use.

In preparing the coagulating liquor, it is preferred to add a coagulating agent since this not only reduces acid requirements but also results in the production of a more clear, carbon black-free serum. As a suitable example of such a coagulating agent there is Polyox water soluble resin produced and sold by Union Carbide Corporation. These resins are described in the literature as polyethers having an approximate molecular weight of 5,000,000.

Furthermore, for many purposes, it may be desirable to incorporate into the rubber masterbatch composition of the present invention other conventional rubber additives. Illustrative of such additives are other reinforcing agents such as titanium dioxide, silicon dioxide, zinc oxide, calcium carbonate, clays, calcium silicate, zinc sulfide, hydrous alumina and calcined magnesia; thermoplastic resins such as polyvinyl chloride, coumarone-indenes, polystyrene, styrene-isobutylene, phenol-aldehydes and epoxy resins as compounding substances; vulcanizing agents; vulcanization accelerators; accelerator activators; sulfur curatives; antioxidants; heat stabilizers; plasticizers; and the like. It will be apparent that compositions containing such other additives are within the scope of this invention.

The invention will be more readily understood by reference to the following example which describes the detailed preparation of a representative rubber-carbon black masterbatch. There are, of course, many other forms of this invention which will become obvious to one skilled in the art, once the invention has been fully disclosed, and it will, accordingly, be recognized that this example is given for the purpose of illustration only, and is not to be construed as limiting the scope of this invention in any way.

EXAMPLE 1

An aqueous carbon black slurry containing 11.8% by weight of Regal 300 carbon black pellets, produced and sold by Cabot Corporation, is prepared in conventional manner such as shown in U. S. Pat. No. 3,294,733. A natural rubber latex containing 28.7% by weight rubber is introduced at a rate of 527 grams per minute into a device suitable for carrying out a creaming of a carbon black-latex mixture. In this instance, there is employed for the creaming operation a stainless steel tube having smooth inner walls and a diameter (one-half inch O. D.) and a length (5 feet) sufficient to allow proper creaming of a carbon black-latex mixture. Into the stainless steel creamer tube containing the natural rubber latex there is then fed the 11.8% by weight carbon black slurry at a rate of 771 grams per minute. The carbon black slurry is introduced in an axial direction so as to assist in maintaining conditions of low shear throughout the creaming operation. This is useful in obtaining optimum masterbatch crumb quality. The creaming of the resulting carbon black-latex mixture then occurs for the required period of time. In general, creaming is complete within a period of two minutes, and in this example, creaming occurred within about 7 seconds. In order to coagulate the creamed carbon black-latex mixture, there is provided a suitable mixing device, in this instance having a ¾ inch I.D., for mixing the creamed mixture with the coagulating liquor. The creamed carbon black-latex mixture is introduced as a coherent stream into the mixer device in a direction substantially transverse to the axis of the stream of coagulating liquor flowing into the mixer device. As a result of this manner of contacting the stream of creamed carbon black-latex mixture with the coagulating liquor stream, there is obtained a proper shearing and atomization of the stream of creamed mixture and a commencing of the coagulation. It is also possible to control this mixing operation with precision. The coagulating liquor used herein is an acidified aqueous solution having in this instance a pH of about 2.5 to 3.5. It is prepared by adding glacial acetic acid at a rate of 525 gallons per minute to water and optionally, as here, a 1% by weight aqueous solution of Polyox coagulant at a rate of 74 cubic centimeters per minute. Following the mixing, the resultant reaction mixture is passed to a suitable reactor, in this example a tube of 1 inch I.D., of sufficient length to permit complete coagulation of the carbon black-latex mixture which occurred here in about 15 to 30 seconds. The serum is then separated from the rubber crumb in any conventional manner. The rubber crumb which is obtained in approximately 100% yield at a rate of 242.2 grams/minute is then washed with water and dried. The serum is then recycled to the coagulating liquor stream where as much as possible is used. Excess serum is simply discarded as waste liquor.

EXAMPLE 2

In order to evaluate the performance qualities of masterbatch as compared to dry mix formulations, the following formulations were employed:

|  | Parts | Parts |
|---|---|---|
| Masterbatch of Example 1 | 155 | — |
| Natural Rubber | — | 100 |
| Regal 300 Carbon Black | — | 55 |
| Zinc Oxide | 4 | 4 |
| Stearic Acid | 2 | 2 |
| Sulfur | 2.5 | 2.5 |
| Santocure | 0.875 | 0.875 |
| Agerite Resin D | 1 | 1 |

The above formulations were cured at 293° F. and the following properties were observed.

|  |  | Masterbatch | Dry Mix |
|---|---|---|---|
| Tensile strength, p.s.i. | 20' | 4240 | 4060 |
|  | 40' | 4020 | 4000 |
| 300% Modulus, p.s.i. | 20' | 2280 | 2440 |
|  | 40' | 2160 | 2500 |
| Elongation, % | 20' | 500 | 460 |
|  | 40' | 480 | 440 |
| Hardness, Shore A2 | 20' | 63 | 67 |
|  | 40' | 63 | 67 |
| Akron Angle Abrasion loss per 10⁶ revolutions | 50' | 320 | 476 |

From the above it is noted that there is substantial improvement in the Akron angle abrasion index. Moreover, it has been found that the masterbatch crumb has better dispersion characteristics than the dry mix crumb.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a process for preparing a carbon black-rubber masterbatch wherein an aqueous carbon black slurry is mixed with a rubber latex to obtain a uniform mixture which is creamed and wherein the creamed carbon black-latex mixture is coagulated with an aqueous acidified solution to yield a rubber crumb-containing solution from which the rubber crumb is separated, washed, dried and recovered and the serum is recycled to the coagulating liquor, the improvement which comprises introducing the carbon black slurry and the latex in the form of separate continuous streams to form a uniform mixture prior to creaming the resulting carbon black-latex mixture and coagulating the resultant creamed mixture by introducing the creamed mixture in the form of at least one coherent stream into a flowing stream of acidified coagulating liquor from the periphery of the stream of coagulating liquor in a direction substantially transverse to the axis of the stream of the coagulating liquor so as to cause the stream of the creamed carbon black-latex mixture to be sheared and atomized prior to the occurrence of coagulation.

2. A process as described in claim 1 wherein the rubber latex is a synthetic rubber latex or a natural rubber latex.

3. A process as defined in claim 1 wherein the aqueous carbon black slurry contains an amount of up to about 30% by weight of carbon black.

4. A process as described in claim 1 wherein the carbon black is in pelleted form.

5. A process as defined in claim 1 wherein a coagulating agent is admixed with the acidified coagulating liquor stream.

6. A process as described in claim 1 wherein the acid used in preparing the coagulating liquor is glacial acetic acid.

7. A process as described in claim 1 wherein the acidified coagulating liquor stream is maintained at a pH of about 2.5 to about 3.0.

* * * * *